US012282132B2

(12) United States Patent
Zhang et al.

(10) Patent No.: US 12,282,132 B2
(45) Date of Patent: Apr. 22, 2025

(54) SEQUENCE TIME WINDOW AMPLITUDE-PHASE-FREQUENCY CHARACTERISTICS ANALYSIS METHOD FOR UNDERWATER VEHICLE POWER FREQUENCY ELECTROMAGNETIC FIELD DISTURBANCE

(71) Applicant: HUAZHONG UNIVERSITY OF SCIENCE AND TECHNOLOGY, Hubei (CN)

(72) Inventors: Tianxu Zhang, Hubei (CN); Yuhai Lv, Hubei (CN); Jiawei Wang, Hubei (CN); Qinghui Zhang, Hubei (CN); Cheng Yang, Hubei (CN); Tao Zhang, Hubei (CN); Jiandong Tan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 116 days.

(21) Appl. No.: 18/148,472

(22) Filed: Dec. 30, 2022

(65) Prior Publication Data

US 2023/0213679 A1 Jul. 6, 2023

(30) Foreign Application Priority Data

Dec. 31, 2021 (CN) .......................... 202111676622.2

(51) Int. Cl.
*G01V 3/08* (2006.01)
*G01V 3/38* (2006.01)

(52) U.S. Cl.
CPC ................ *G01V 3/081* (2013.01); *G01V 3/38* (2013.01)

(58) Field of Classification Search
None
See application file for complete search history.

(56) References Cited

U.S. PATENT DOCUMENTS

2012/0056779 A1* 3/2012 Freking ................. G01S 7/5273
342/189

* cited by examiner

*Primary Examiner* — Jas A Sanghera
(74) *Attorney, Agent, or Firm* — HSML P. C.

(57) ABSTRACT

A sequence time window amplitude-phase-frequency characteristics analysis method and system for underwater vehicle power frequency electromagnetic field disturbance are provided. The method includes: establishing a power grid dipole group model, emulating and calculating to obtain background field intensity data of a test location, and constructing an emulated background field database; acquiring measured background field data, comparing the emulated data with the measured data, and providing a relative error; calculating a background field intensity and underwater vehicle target disturbance under the action of the above dipole group, and establishing a measured target signal database; and performing actual measurement according to an underwater vehicle motion and detection topology, performing a Fourier transform and Fourier sliding window decomposition after acquiring original data, and acquiring an amplitude spectrum and a spectrogram of an underwater vehicle target disturbance signal.

7 Claims, 10 Drawing Sheets

SEQUENCE TIME WINDOW AMPLITUDE-PHASE-FREQUENCY CHARACTERISTICS ANALYSIS METHOD FOR UNDERWATER VEHICLE POWER FREQUENCY ELECTROMAGNETIC FIELD DISTURBANCE

TECHNICAL FIELD

The present invention pertains to the field of photoelectric detection, and relates to a sequence time window amplitude-phase-frequency characteristics analysis method for underwater vehicle power frequency electromagnetic field disturbance.

BACKGROUND ART

The marine science and technology is the primary productive force, and is also an important means of developing the maritime economy. The marine high and new technology is universally recognized by global scholars as one of the most important areas in the revolution of new science and technology. The development of unmanned underwater detectors/underwater robots promotes the development of the maritime economy and replacement of manual operation in harsh environments. The unmanned underwater detectors/underwater robots can be applied to maritime rescue, and can also be applied to fields such as petroleum development, topographical surveying, scientific research, aquaculture, underwater hull maintenance and cleaning, diving entertainment, urban duct inspection, etc. The market is also developing. Detection and tracking of an underwater target is the important basis and precondition of development of unmanned undersea detectors. Due to the important commercial and military value thereof, the detection and tracking of an underwater target has drawn attention of more and more experts, scholars, production personnel, and technicians.

In the context of the new situation of economic globalization, global trade is extremely close. The total import and export volume of all countries in the world, especially China, shows a rapid growth rate. Ship transportation is favored by global enterprises and businesses with its huge freight volume and efficient cargo security. As a result, the number of ships and the tonnage of ships in ship manufacturing enterprises increase year by year. Safety issues with the ships during navigation have always been the focus of attention.

Ferromagnetic objects such as shipwrecks and naval mines left by wars are widely studied in marine exploration. The shipwreck salvage and naval mine detection need accurate locating. At the same time, underwater shipwrecks and naval mines are also important elements that affect the marine navigation environment. At the same time, the increasing range of activities of autonomous underwater vehicles and underwater robots has also become an important factor affecting the marine navigation. It is particularly important to detect ferromagnetic targets such as the shipwrecks and the autonomous underwater vehicles during ship navigation.

The conventional underwater target detection means is typically the use of a sonar detection method, which senses the orientation of the target by receiving the sonar echo of the detected object. There are some problems in using sonar to detect underwater targets such as the shipwrecks. The shipwrecks are often covered by ocean sediment, while the sonar means is susceptible to the disturbance of the undulating terrain of the seabed, resulting in many false alarm detections. At the same time, acoustic detection needs to arrange a large number of detection arrays, which is expensive and vulnerable to the interference of marine background noise. Using the acoustic detection means, it has been difficult to detect underwater targets hidden under the ocean background noise across a long distance and within a large range, which cannot meet the detection needs of the vast sea areas in China. Therefore, it is urgent to develop new non-acoustic remote sensing detection means to detect underwater targets.

Professor ZHANG Tianxu of Huazhong University of Science and Technology has proposed to detect underwater ferromagnetic targets by using power frequency electromagnetic fields generated by power grids of countries around the world. High-voltage power transmission/transformation/consumption networks throughout the world generate power frequency electromagnetic fields. The power frequency electromagnetic field has high penetration performance, and can penetrate the sea to act on an underwater ferromagnetic target. Under the action of the power frequency electromagnetic field (waves), the target generates a distorted signal, thereby enabling an underwater ferromagnetic target to be detected.

SUMMARY OF THE INVENTION

In view of the defects in the prior art, an objective of the present invention is to provide a sequence time window amplitude-phase-frequency characteristics analysis method for underwater vehicle power frequency electromagnetic field disturbance, which is intended to solve the problem of suppressing interference of background clutter and effectively detecting a disturbance signal caused by an underwater vehicle target.

To achieve the above objective, provided in the present invention is a sequence time window amplitude-phase-frequency characteristics analysis method for underwater vehicle power frequency electromagnetic field disturbance, comprising the steps of:

determining background field data, the background field data referring to power frequency electromagnetic data obtained when no ferromagnetic target object is present in a predetermined region, wherein if power frequency electromagnetic measurement can be directly performed in the preset region, the background field data is acquired by means of actual measurement, and otherwise, the background field data is acquired by constructing a power grid dipole group model for the predetermined region to perform emulation;

determining measured data obtained when a target object passes through the predetermined region, the target object being an underwater vehicle;

respectively performing a short-time Fourier transform on the background field data and the measured data, extracting a 50 Hz electromagnetic signal corresponding to each piece of the above data, and performing Fourier sliding window decomposition on each 50 Hz electromagnetic signal to acquire a corresponding sliding sequence time window signal;

when a disturbance signal is present in a certain time window sequence in the sliding sequence time window signal of the measured data, cut the disturbance signal continues over a plurality of time windows, considering that an underwater vehicle is passing through the predetermined region;

comparing amplitude intensities of the sliding sequence time window signal of the background field data and the sliding sequence time window signal of the measured data, and determining, according to a comparison change in the amplitude intensity, a location in the predetermined region through which the underwater vehicle is passing; and analyzing a phase spectrum of the 50 Hz electromagnetic signal of the measured data to determine a pattern of change of the phase spectrum when the underwater vehicle passes through the predetermined region.

In an alternative embodiment, the acquiring the background field data by constructing a power grid dipole group model for the predetermined region to perform emulation specifically comprises:

constructing a power grid dipole group model comprising an air layer, a sea layer, a land layer, a seabed layer and an ionized layer, and a relative magnetic permeability and a relative electrical conductivity corresponding to each layer;

emulating, on the basis of the power grid dipole group model, a power frequency magnetic field intensity of a background field that can be actually measured, and acquiring emulated background field data;

actually performing power frequency electromagnetic field measurement on the background field to acquire measured background field data;

comparing the emulated background field data and the measured background field data, determining a relative error, and adjusting the power grid dipole group model on the basis of the relative error, such that a relative error of background field data emulated by the power grid dipole group model relative to the measured background field data is less than a preset error value; and using the adjusted power grid dipole group model to emulate a background field that cannot be actually measured so as to acquire corresponding background field data thereof.

In an alternative embodiment, the power frequency electromagnetic data of the predetermined region is measured by means of a sensor;

a plurality of such sensors are provided to acquire electromagnetic signals in specified locations, and when a ferromagnetic target object passes through the specified locations where the sensors are located, the electromagnetic signals in the locations change;

the sensors are placed in the preset region.

In an alternative embodiment, the determining, according to a comparison change in the amplitude intensity, a location in the predetermined region through which the underwater vehicle is passing specifically comprises:

when the underwater vehicle passes through the predetermined region, a magnetic field intensity of a 50 Hz electromagnetic signal component corresponding to the measured data changes in an overall pattern of increase, decrease, increase, and decrease.

In an alternative embodiment, the determining, according to a comparison change in the amplitude intensity, a location in the predetermined region through which the underwater vehicle is passing specifically comprises:

when the underwater vehicle approaches the sensor, a magnetic field intensity of a 50 Hz electromagnetic signal component corresponding to the measured data increases gradually; and when a front end of the underwater vehicle reaches the sensor, the magnetic field intensity reaches a peak, and then decreases gradually.

In an alternative embodiment, the determining, according to a comparison change in the amplitude intensity, a location in the predetermined region through which the underwater vehicle is passing specifically comprises:

when the middle of the underwater vehicle reaches the sensor, the magnetic field intensity decreases to a lowest point, and then increases gradually; and when a rear end of the underwater vehicle reaches the sensor, the magnetic field intensity reaches a peak again, and then decreases gradually to a magnetic field intensity of a background field, the value of the magnetic field intensity of the background field being determined according to a 50 Hz electromagnetic signal component corresponding to background field data.

In an alternative embodiment, the analyzing a phase spectrum of the 50 Hz electromagnetic signal of the measured data to determine a pattern of change of the phase spectrum when the underwater vehicle passes through the predetermined region specifically comprises:

performing Fourier decomposition on the measured data to extract the 50 Hz electromagnetic signal, and further performing Fourier decomposition on the 50 Hz electromagnetic signal to extract a 50 Hz phase spectrum, wherein when the underwater vehicle passes the sensor, the phase spectrum changes in a dense-sparse-dense pattern.

In general, compared with the prior art, the above technical solutions conceived by the present invention have the following beneficial effects:

Provided in the present invention is a sequence time window amplitude-phase-frequency characteristics analysis method for underwater vehicle power frequency electromagnetic field disturbance, which can suppress interference of background clutter and effectively detect a disturbance signal caused by an underwater vehicle. When an underwater vehicle passes a magnetic detection instrument, disturbance lasting through a plurality of time windows occurs in a spectrogram acquired by performing a Fourier transform and sliding window Fourier decomposition on an original signal thereof, and the disturbance has the tendency to increase first, then decrease, then increase, and finally decrease to a background field. A magnetic disturbance signal has a peak that is many times intensity of background field signal, and is significantly stronger than the background field signal, resulting in a good detection effect.

DETAILED DESCRIPTION

To make the purpose, technical solution, and advantages of the present invention clearer, the present invention is further described in detail below in connection with the accompanying drawings and embodiments. It should be understood that the specific embodiments described herein are only used to explain the present invention, but not to limit the present invention.

Provided in the present invention is a sequence time window amplitude-phase-frequency characteristics analysis method for underwater vehicle power frequency electromagnetic field disturbance, including: establishing a power frequency power grid dipole group model, emulating and calculating background field intensity data of a test location, and constructing an emulated background field database; acquiring measured background field data, comparing the emulated data with the measured data, and providing a relative error; emulating and calculating background field intensity and underwater vehicle target disturbance under the action of the above dipole group, and establishing a measured target signal database; and performing actual measurement according to an underwater vehicle motion and detection topology, performing a Fourier transform and Fourier sliding window decomposition after acquiring original data, and acquiring an underwater vehicle target disturbance signal amplitude spectrum and frequency spectrum diagram. If an acquired disturbance signal lasts over a plurality of time windows, then it is determined that the disturbance is caused by an underwater vehicle, and otherwise, it is determined that the disturbance is noise.

Figure 1:
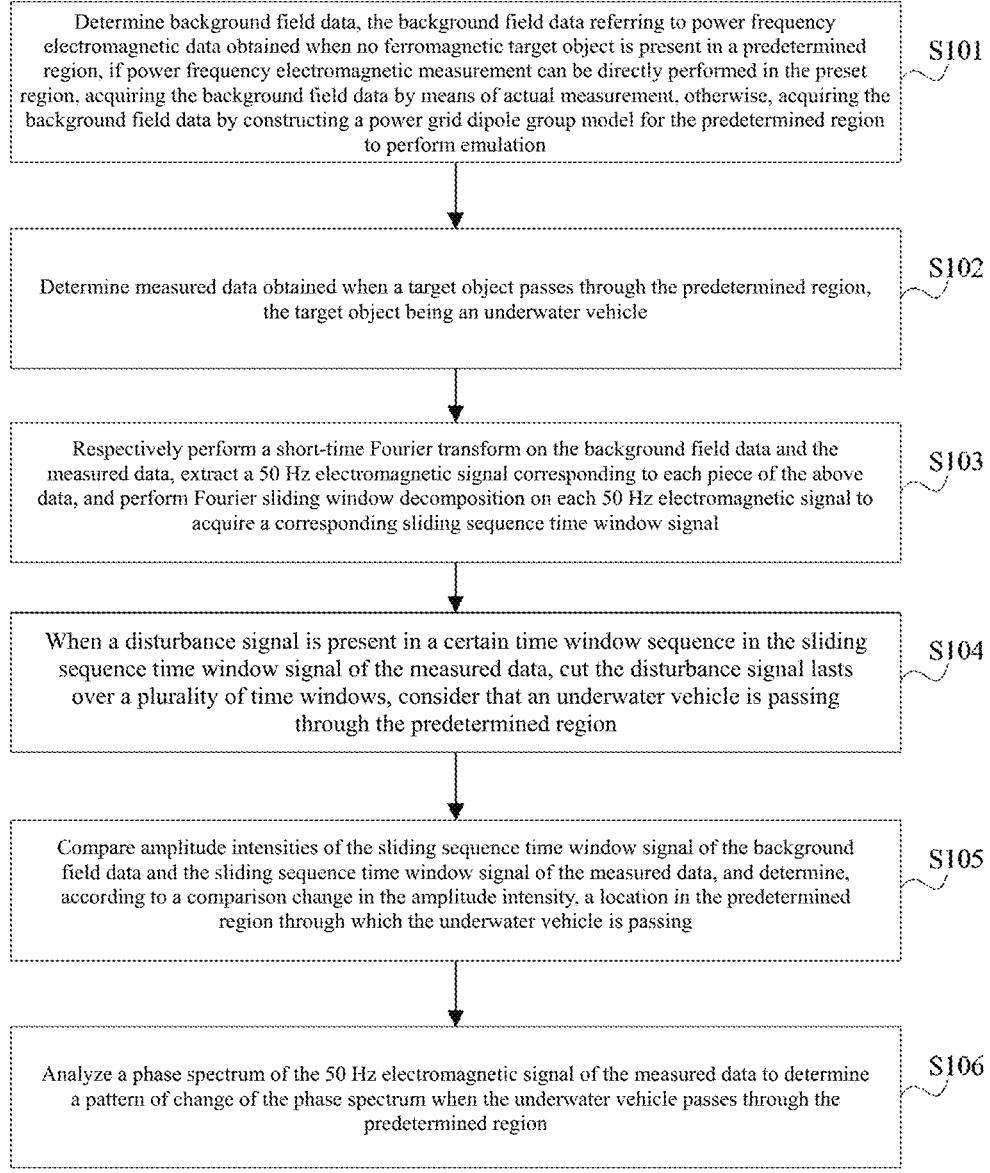
FIG. 1 is a flowchart of a sequence time window amplitude-phase-frequency characteristics analysis method for underwater vehicle power frequency electromagnetic field disturbance according to an embodiment of the present invention.

FIG. 1 is a flowchart of a sequence time window amplitude-phase-frequency characteristics analysis method for underwater vehicle power frequency electromagnetic field disturbance according to an embodiment of the present invention. As shown in FIG. 1, the method includes the steps of:

S101, determining background field data, the background field data referring to power frequency electromagnetic data obtained when no ferromagnetic target object is present in a predetermined region, wherein if power frequency electromagnetic measurement can be directly performed in the preset region, the background field data is acquired by means of actual measurement, and otherwise, the background field data is acquired by constructing a power grid dipole group model for the predetermined region to perform emulation;

S102, determining measured data obtained when a target object passes through the predetermined region, the target object being an underwater vehicle;

S103, respectively performing a short-time Fourier transform on the background field data and the measured data, extracting a 50 Hz electromagnetic signal corresponding to each piece of the above data, and performing Fourier sliding window decomposition on each 50 Hz electromagnetic signal to acquire a corresponding sliding sequence time window signal;

S104, when a disturbance signal is present in a certain time window sequence in the sliding sequence time window signal of the measured data, cut the disturbance signal continues over a plurality of time windows, considering that an underwater vehicle is passing through the predetermined region;

S105, comparing amplitude intensities of the sliding sequence time window signal of the background field data and the sliding sequence time window signal of the measured data, and determining, according to a comparison change in the amplitude intensity, a location in the predetermined region through which the underwater vehicle is passing; and S106, analyzing a phase spectrum of the 50 Hz electromagnetic signal of the measured data to determine a pattern of change of the phase spectrum when the underwater vehicle passes through the predetermined region.

In an alternative embodiment, the acquiring the background field data by constructing a power grid dipole group model for the predetermined region to perform emulation specifically comprises:

constructing a power grid dipole group model including an air layer, a sea layer, a land layer, a seabed layer and an ionized layer, and a relative magnetic permeability and a relative electrical conductivity corresponding to each layer;

emulating, on the basis of the power grid dipole group model, a power frequency magnetic field intensity of a background field that can be actually measured, and acquiring emulated background field data;

actually performing power frequency electromagnetic field measurement on the background field to acquire measured background field data;

comparing the emulated background field data and the measured background field data, determining a relative error, and adjusting the power grid dipole group model on the basis of the relative error, such that a relative error of background field data emulated by the power grid dipole group model relative to the measured background field data is less than a preset error value; and using the adjusted power grid dipole group model to emulate a background field that cannot be actually measured so as to acquire corresponding background field data thereof.

In an alternative embodiment, the power frequency electromagnetic data of the predetermined region is measured by means of a sensor;

a plurality of such sensors are provided to acquire electromagnetic signals in specified locations, and when a ferromagnetic target object passes through the specified locations where the sensors are located, the electromagnetic signals in the locations change;

the sensors are placed in the preset region.

In a specific embodiment, according to the pattern that a power frequency electromagnetic field (wave) generated by the power frequency power grid dipole group model and a ferromagnetic underwater vehicle interact with each other to generate a disturbance signal: energy of the disturbance signal is greater than an average value of a background field, and a detection point can receive background fields (waves) within a 360° range thereof. Thus, how to suppress interference of background clutter and effectively detect a disturbance signal caused by an underwater vehicle becomes the core of the present invention. Specifically, the following steps are included:

(1) According to emulation of interaction between a dipole group and an underwater vehicle, it can be seen that the background field changes spatially. That is, at the same time point, background field intensity is different in different locations, and in the same location, background field intensity is different at different time points. The background field intensity may be expressed as B(x, y, z, t). That is, it is considered that the background field intensity may be represented by a function involving a spatial location and a time.

Figure 2:
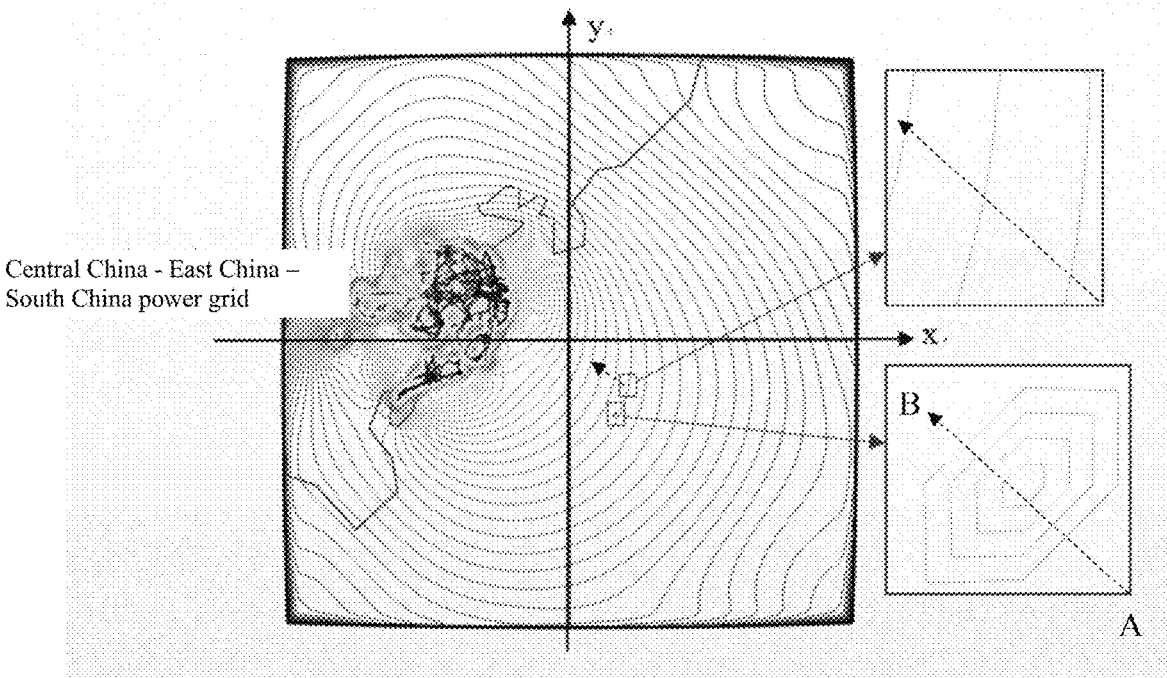
FIG. 2 is a schematic diagram of a motion path of an underwater vehicle in a power grid dipole group model according to an embodiment of the present invention.

When detection is performed at a fixed observation point, the background field intensity on an underwater vehicle scan path fluctuates. That is, when an underwater vehicle is traveling, the background field of the location passed thereby changes constantly, and is not static. As shown in FIG. 2: during movement of an emulated underwater vehicle from a point A to a point B, background field intensity of the point A and that of the point B are different. It is therefore necessary to respectively establish an emulated background field database and a measured background field database.

(2) Windowing information processing is performed to detect an underwater vehicle disturbance signal.

An underwater vehicle is spatially and temporally localized, and the position thereof and the time at which the underwater vehicle passes the observation point are unknown. Therefore, when real-time detection is performed at a fixed observation point, time windowing information processing needs to be performed to determine whether and when an underwater vehicle passes and change in a distance thereof to the observation point.

(3) A search path, i.e., a travel path of the underwater vehicle, is determined according to a topological relationship between the detection point and the underwater vehicle.

Figure 3:
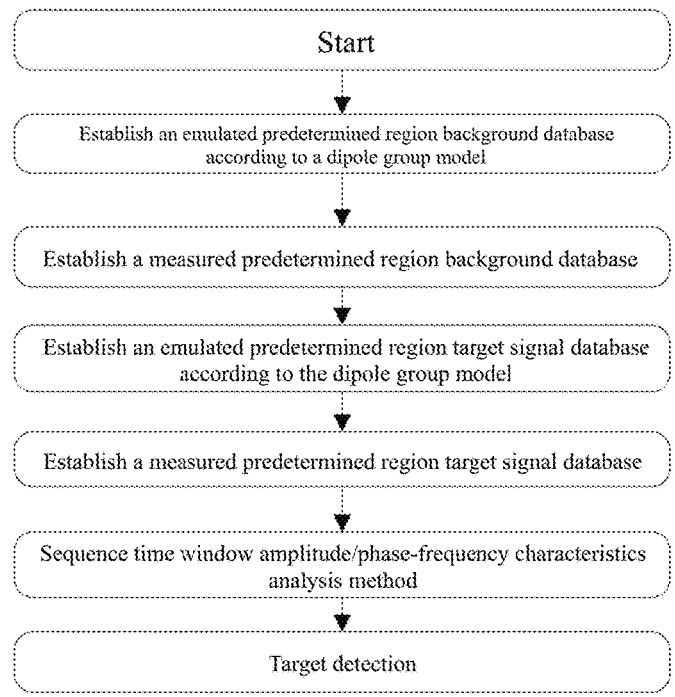
FIG. 3 is a schematic flowchart of an underwater vehicle target signal detection algorithm combining an emulation model and measured data according to an embodiment of the present invention.

(4) Since the electromagnetic properties of both the background and the target power frequency are random, the present invention provides expressions of the amplitude spectrum and the phase spectrum of power frequency electromagnetic disturbance in the time window. A flowchart of an algorithm is shown in FIG. 3. The algorithm includes the steps of:

S1, acquiring background field data, and establishing a background clutter database.

S1.1, establishing an emulated background field database.

Power transmission networks of different voltage levels are selected, are respectively emulated first, and are then superimposed. Three-phase emulation is performed. A power grid dipole group model is constructed. Medium layers including an air layer, a sea layer, a land layer, a seabed layer, and an ionized layer, and parameters including a relative magnetic permeability mur, a relative electrical conductivity sigma corresponding to each layer, etc. are configured. The latitude and longitude coordinates (x, y, z) of a test location are acquired. Corresponding background field intensity data Amplitude_1 thereof is calculated according to a dipole group emulation model, and the emulated background field database is constructed accordingly.

S1.2, establishing a measured background field database.

Continuous signal acquisition is performed in the test location for a long period of time. After a sensor acquires original data, a power frequency signal of a 50 Hz component is extracted by means of a short-time Fourier transform. Specifically, for an original signal f(t), a time-frequency localized window function is selected. Assuming that an analytical window function g(t) is smooth over a short time interval, the window function is moved to cause f(t)g(t) to be a smooth signal within different finite time widths, so as to calculate an amplitude spectrum at each different time point. The short-time Fourier transform may be expressed as:

$$STFT_z(t,f)=\int_{-\infty}^{+\infty}[z(u)g^*(u-t)]e^{-j2\pi fu}du;$$

where z(u) is a source signal, and g(t) is the window function.

After the power frequency background field intensity of the test location is calculated, the average value Amplitude_2 thereof can be calculated, and the measured background field database is established accordingly.

S1.3, comparing emulated background field data and measured background field data.

The emulated and calculated background field intensity Amplitude_1 of the test location and the measured average background field intensity Amplitude_2 are compared, and a relative error is calculated:

$$e = \frac{Amplitude_2 - Amplitude_1}{Amplitude_2}.$$

The emulation model is adjusted on the basis of the relative error, so that the emulation model can achieve emulation precision to meet requirements.

S2, acquiring a target signal, and establishing a target signal database.

S2.1, establishing an emulated target signal database.

An underwater target model is placed in the emulated background field constructed in step S1.1. The location (x, y, z) and specific parameters, such as the radius r, the length l, the thickness δ, the magnetic permeability μ, etc., of the target are acquired. A calculation result of the power frequency electromagnetic field (wave) background and underwater vehicle target magnetic disturbance under the action of the aforementioned dipole group model is calculated and emulated.

S2.2, establishing a measured target signal database.

Actual measurement is performed according to an underwater vehicle motion and detection topology. A sequence signal of the underwater target passing a magnetic detector is acquired, and a sensor acquires original data of aliasing frequencies. Then, 50 Hz signal data is extracted by means of a short-time Fourier transform, and the measured target signal database is established accordingly.

S3, providing, on the basis of S1 and S2, a sequence time window amplitude/phase-frequency characteristics analysis method for underwater vehicle power frequency electromagnetic field disturbance.

After the sensor acquires the original data, a Fourier transform is performed on the original signal to extract 50 Hz signal strength and phase data. In order to effectively distinguish the target signal, Fourier sliding window decomposition is further performed on the signal to acquire a sliding sequence time window signal.

A Fourier transform performed on an aperiodic continuous time signal x(t) may be expressed as:

$$X(w)=\int_{-\infty}^{+\infty}x(t)e^{-jwt}dt;$$

where x(t) is the original function, and is an original time domain signal. The transformed frequency domain signal X(w) is an image function of the Fourier transform. The original function and the image function constitute a Fourier transform pair.

The sliding window size n is set when the Fourier sliding window decomposition is performed, and the signal is stepped by the size of the time window. By checking whether a disturbance in the sliding sequence time window signal persists, it can be determined whether the disturbance is systematic disturbance caused by the underwater vehicle or noise. Specifically, if a disturbance appears in a certain time window sequence, but disappears in a next time window sequence, then it can be considered that the disturbance is not caused by the target. If the disturbance signal lasts over a plurality of time windows, it can be considered that the disturbance is caused by an underwater vehicle, and is a systematic disturbance.

1. Establishing an Emulated Background Field Database

Figure 4:
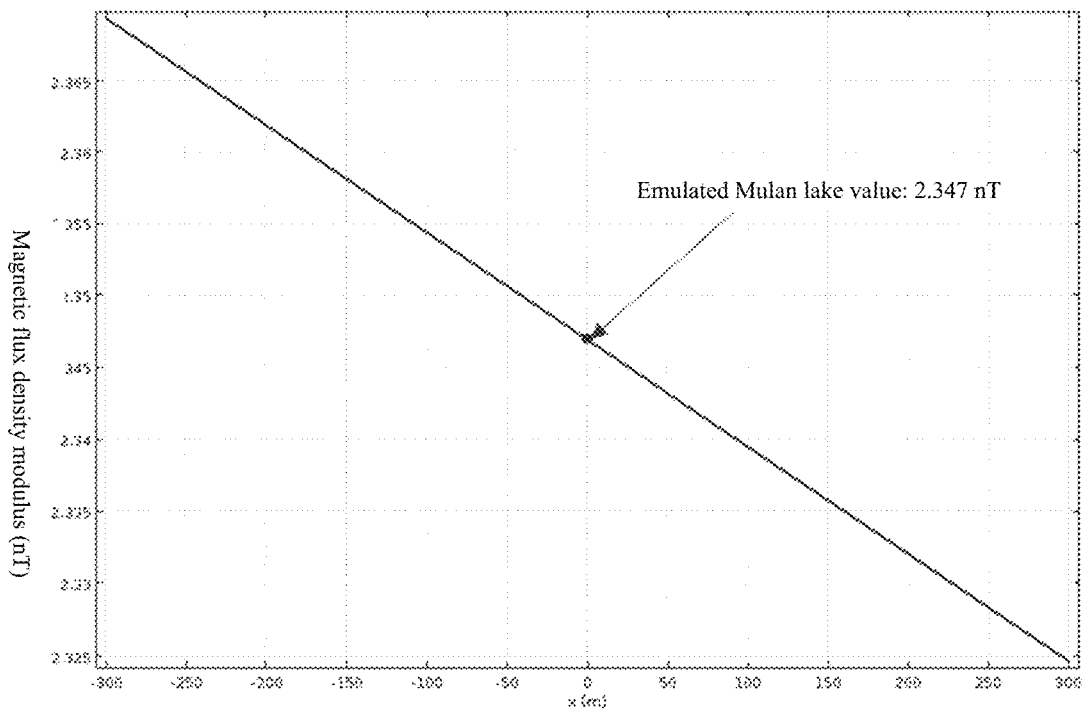
FIG. 4 is a schematic diagram of a calculated value of an emulated background field at a Mulan lake test location according to an embodiment of the present invention.

In order to construct the emulated background field database, the team first established a power grid dipole group model. According to the current Chinese power grid Central China-East China-South China 1000 kV and 500 kV power transmission networks, the 220 kV power transmission networks of the provinces, and the 110 kV power transmission networks of some provinces, the power grids were respectively emulated, and were then superimposed. Three-phase emulation was performed. Medium layers including an air layer, a sea layer, a land layer, a seabed layer, and an ionized layer, and parameters including a relative magnetic permeability mur, a relative electrical conductivity sigma corresponding to each layer, etc. were configured. The latitude and longitude coordinates (30° 7'8" N, 114° 28'1" E) of the test location, i.e. the Mulan lake reservoir of Wuhan in Hubei, were acquired. Corresponding background field intensity data thereof was acquired from the dipole group emulation model, as shown in FIG. 4.

2. Establishing a Measured Background Field Database

Figure 5:
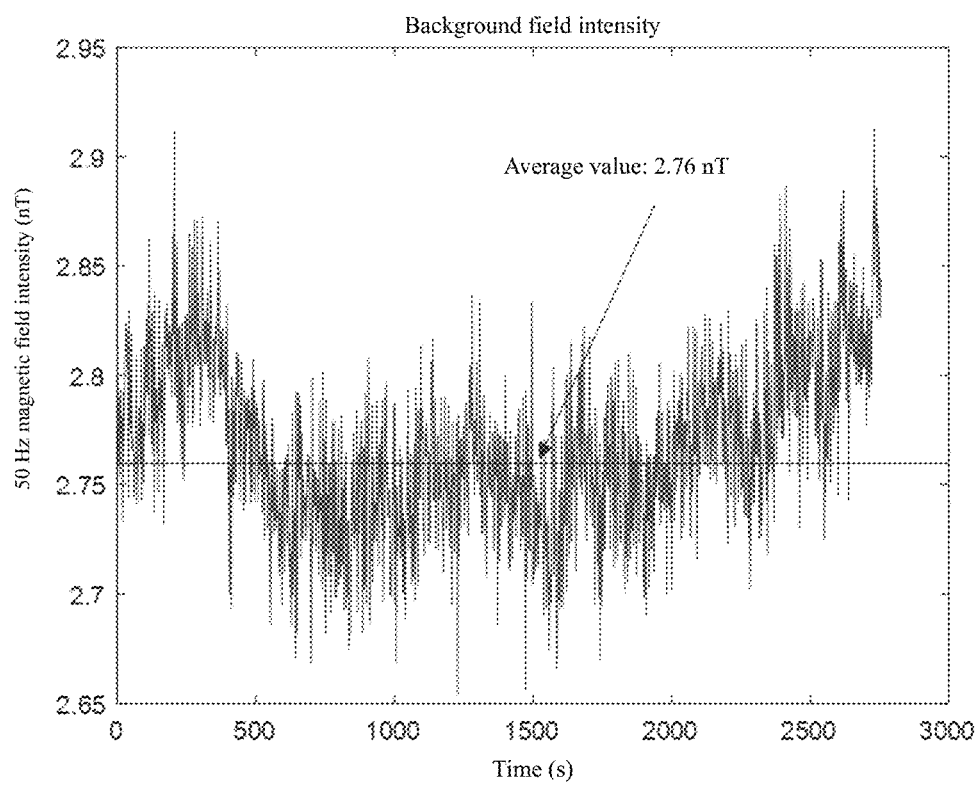
FIG. 5 is a schematic diagram of measured background field intensity data at a Mulan lake test location according to an embodiment of the present invention.

To establish the measured background field database, using the Mulan lake test as an example, in order to analyze the power frequency magnetic field background intensity and stability of the Wuhan Mulan lake test region, a variety of sensors were used to measure, in different land and underwater locations, power frequency magnetic fields at a test wharf and a nearby water area. The research team acquired the power frequency background field data at the white kiosk at the center of the Mulan lake and the wharf on the shore. The measurement method was to fix a single-axis inductive sensor or a three-axis fluxgate sensor in a measurement location, and perform continuous signal acquisition for a long period of time. The power frequency signal of the 50 Hz component was extracted by means of a short-time Fourier transform to acquire the power frequency background field measurement result of the Mulan lake, and the average value thereof was calculated, as shown in FIG. 5.

A relative error can be calculated by means of the comparison between the emulated background field data and the measured data. The emulated value of the background field intensity of the Mulan lake test location was 2.347 nT. The average value of the measured background field intensity was 2.76 Nt. The error was 14.96%.

3. Establishing an Emulated Target Signal Database

To establish the emulated target signal database, the project team constructed the low-orbit platform detection underwater vehicle emulation model employing the Chinese power grid.

<1> Selection of the power grid: East China-Central China-South China 1000 kV and 500 kV power grids, and the 220 kV and 110 kV power grids of the provinces are respectively emulated, and are then superimposed. Three-phase emulation is performed.

<2> Medium layers: the air layer, the sea layer, the land layer, the seabed layer, and the ionized layer.

<3> Target location: the target is near the Philippine sea area, and is at the water depth of 120 m.

<4> Target parameters: the radius of 11 m, the length of 170 m, the thickness of 1.25 m, and the magnetic permeability of 500.

The specific parameter setting is shown in the following table:

| Medium Layer | Relative Dielectric Constant | Relative Magnetic Permeability | Electrical Conductivity (S/m) |
| --- | --- | --- | --- |
| Air layer | 1 | 1 | 0 |
| Land layer | 30 | 1 | 1.5 |
| Sea layer | 80 | 1 | 3 |
| Ionized layer D | 1 | 1 | 10^−8 |
| Ionized layer E | 1 | 1 | 10^−4 |
| Ionized layer F1 | 1 | 1 | 10^−6 |
| Ionized layer F2 | 1 | 1 | 10^−8 |

Figure 6:
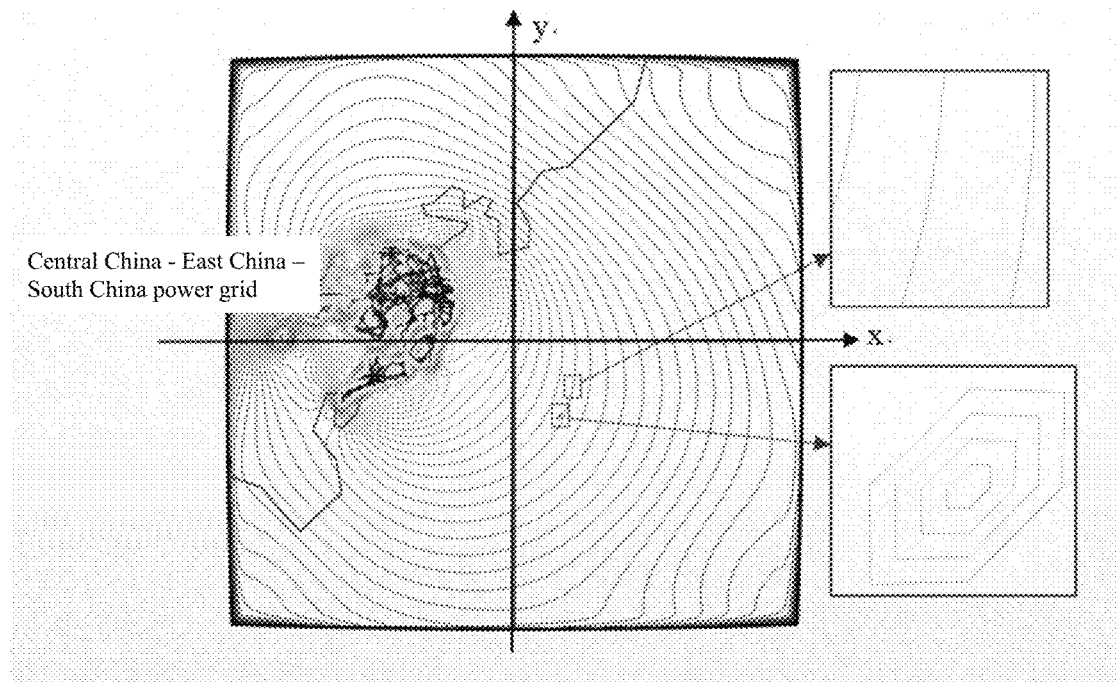
FIG. 6 is a schematic diagram of a background power frequency magnetic field and underwater vehicle target disturbance calculation result in a Central China-East China-South China power grid emulation model according to an embodiment of the present invention.
Figure 7:
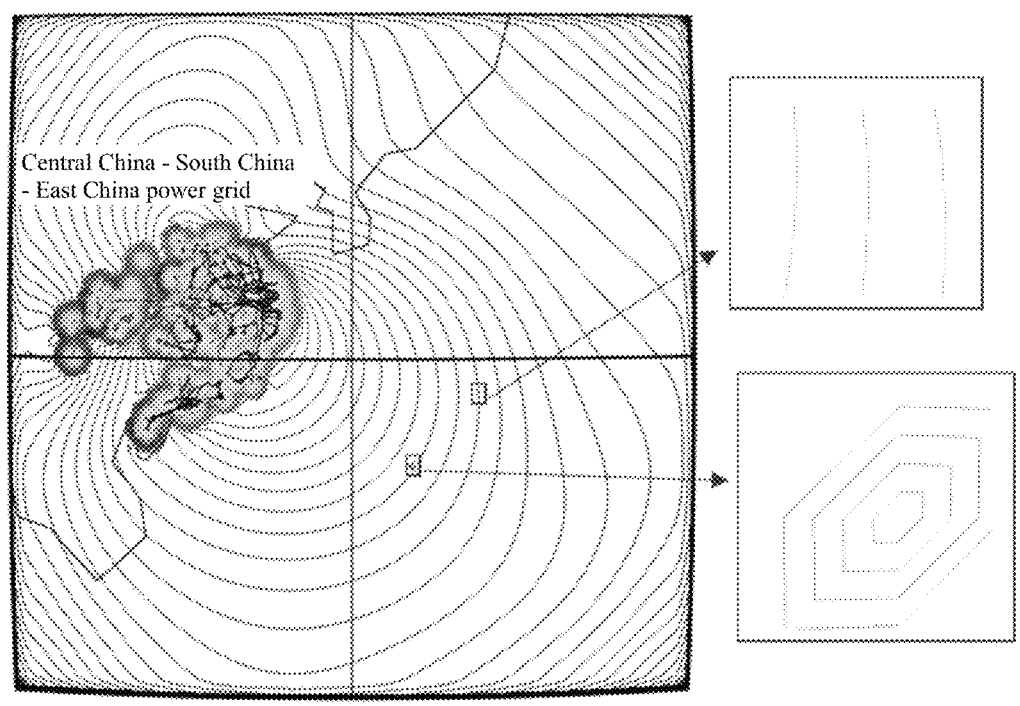
FIG. 7 is a schematic diagram of a background power frequency magnetic field and underwater vehicle target disturbance calculation result in a Central China-South China-East China power grid emulation model according to an embodiment of the present invention.

Analysis of Emulation Calculation Result:

The underwater vehicle model was placed at the sea depth of 100 m, the position coordinates thereof being (460 km, −470 km), and the latitude and longitude coordinates thereof being (132° 07'12.67" E, 21° 57'28.97" N). A calculation result of the power frequency electromagnetic field (wave) background and underwater vehicle target magnetic disturbance under the joint action of the aforementioned power grids was calculated. A contour map corresponding to a Central China-East China-South China power grid emulation model is shown in FIG. 6. A contour map corresponding to a Central China-South China-East China power grid emulation model is shown in FIG. 7.

As can be seen from the results in the drawings: the underwater vehicle and the power frequency electromagnetic field (wave) generated by the power frequency electromagnetic radiation source interacted with each other. An obvious electromagnetic abnormal signal was generated near the target, but the background power frequency magnetic field distribution located away from the underwater vehicle was relatively uniform. Measured at the height of 200 m above the sea level, the magnetic anomaly modulus value of the underwater vehicle was 1623 pT, the background power frequency magnetic field modulus value being about 77 pT, and the magnetic disturbance signal being about 21 times the power frequency background magnetic field modulus.

A model, in which the three-phase Central China-East China-South China power grid was used as an excitation source and the relative magnetic permeability of the target is 500, was used as an example. The geometric center of the model was Okinawa. The emulated underwater vehicle model (the length of 100 m and the diameter of 10 m) was respectively horizontally placed along the x axis at the water depth of 100 m in a certain sea area near the Philippines and the Philippine sea area of 600 km away from the coastline.

Figure 8:
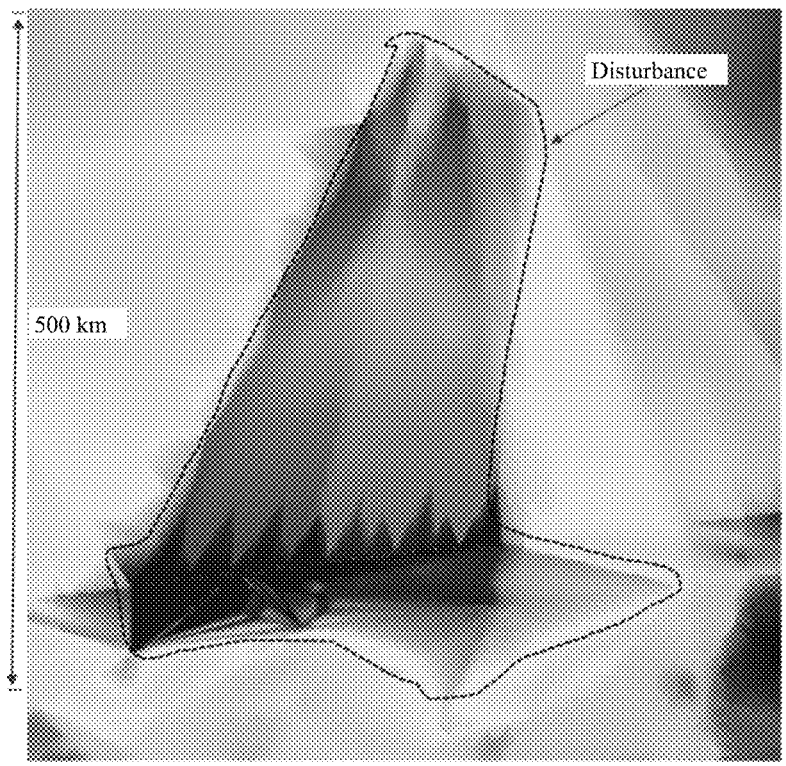
FIG. 8 is a schematic diagram of a three-dimensional side view of propagation of a target local abnormal power frequency magnetic field signal (logarithmized) according to an embodiment of the present invention.
Figure 9:
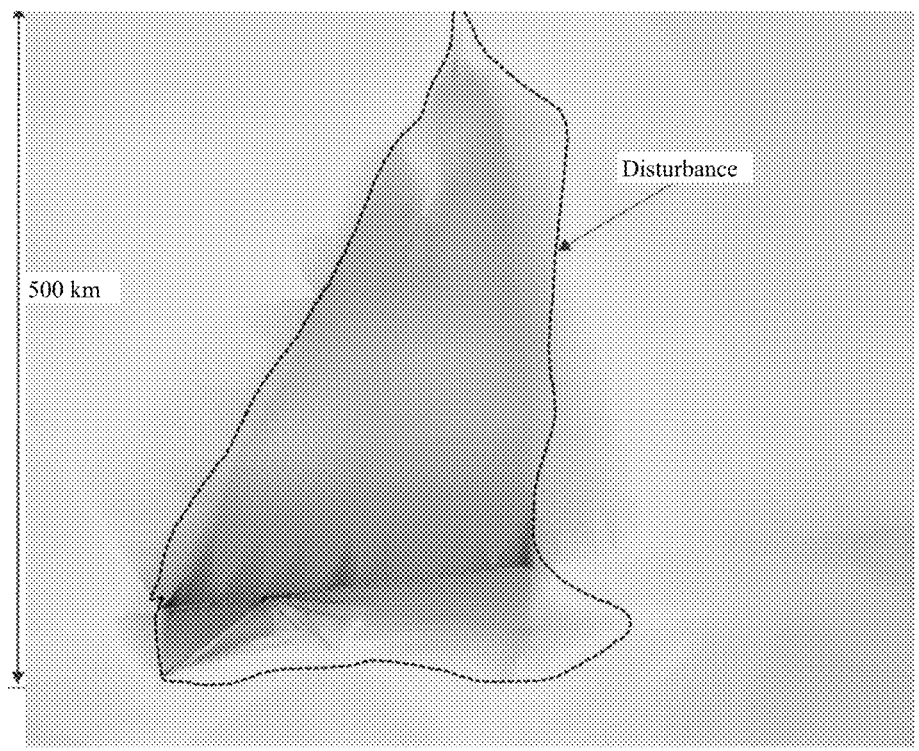
FIG. 9 is a schematic diagram of a three-dimensional side view of propagation of a target local abnormal power frequency electric field signal (logarithmized) according to an embodiment of the present invention.

FIG. 8 and FIG. 9 more intuitively illustrate the phenomenon in which the target electric and magnetic signals propagate upwards from the underwater target to a position above the sea level. The abnormal electromagnetic signal generated under water had high intensity and a large disturbance range. When propagating above the water surface, the intensity of the electromagnetic abnormal signal decreases, and the range shrinks. It can be seen that the target signal was still detectable at the height of 500 km.

4. Establishing a Measured Target Signal Database

To obtain the target signal data, the measured target signal database was established. The team performed the open-air water area underwater target scale model field special test. The test locations are base 603 in Guangde of Anhui and the Mulan lake in Wuhan of Hubei.

Test location: Mulan lake

Test data: fluxgate three-exis data. Analysis was respectively performed on x/y/z axis data.

Sampling rate: 1024 Hz

AD: 24 bits; the number of significant bits: 18

Analysis frequency: 50 Hz

Test conditions: the underwater vehicle was 6.3 m away from the shore, and the diving depth was 1 m.

Figure 10:
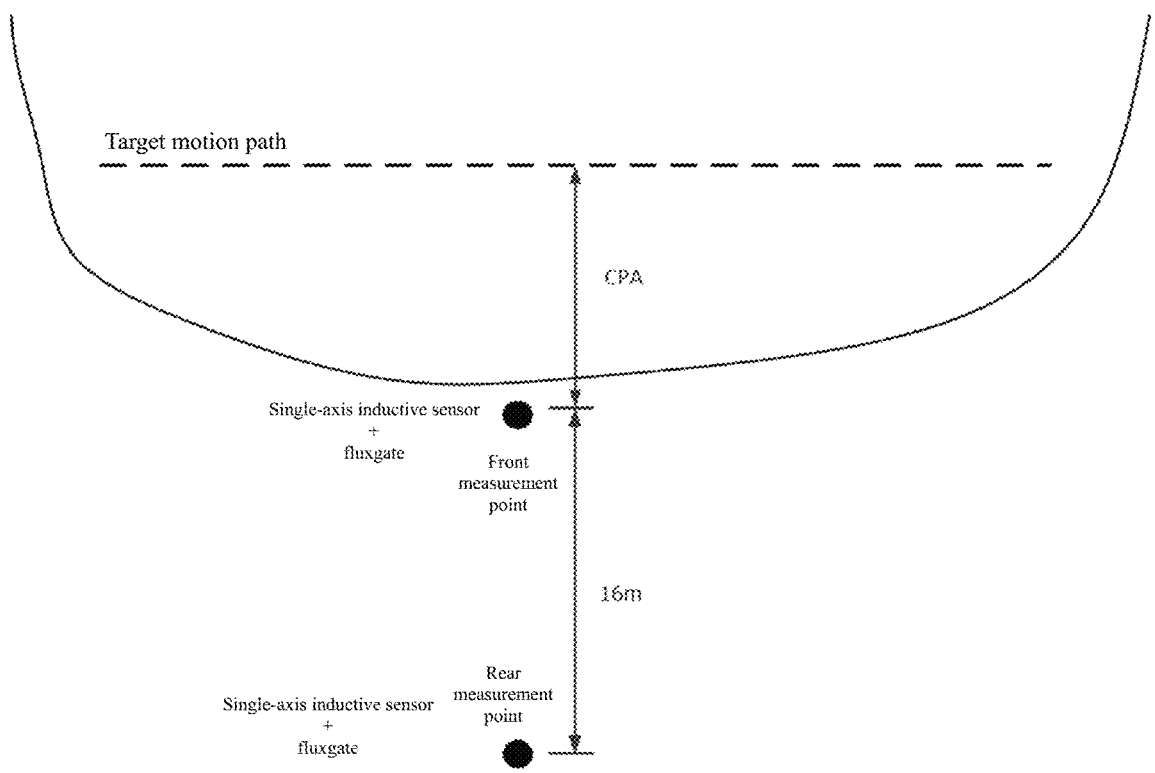
FIG. 10 is a schematic diagram of a Mulan lake test according to an embodiment of the present invention.

The schematic diagram of the Mulan lake test was shown in FIG. 10. To measure the characteristics of passing of the target, two fluxgate and single-axis inductive sensors were used in the test. The two sets of sensors were respectively placed in a front position and a rear position, so as to facilitate subsequent differential processing. During the test, an excitation coil was activated, and the target was caused to move to pass the vicinity of the sensor. Magnetic field signals are acquired continuously and analyzed.

Figure 11:
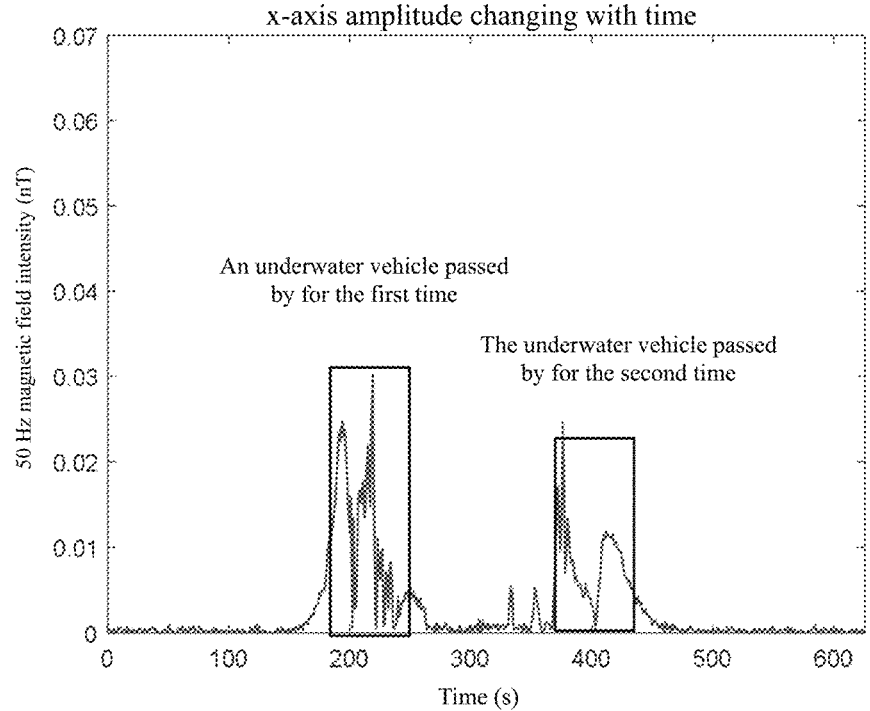
FIG. 11 is a diagram of a fluxgate 50 Hz magnetic field x-axis amplitude changing with time according to an embodiment of the present invention.

5. Sequence Time Window Amplitude/Phase-Frequency Characteristics Analysis Method The sensor acquired the original data. 50 Hz signal data was acquired by means of a Fourier transform. The transform was performed again to acquire a sliding sequence time window signal. An acquired 50 Hz magnetic field x-axis amplitude change diagram is shown in FIG. 11. According to the drawing, it can be seen that when the underwater vehicle was far away, the background field intensity was about 0.001 nT, i.e., 1 Pt. The peak of the target signal generated when the underwater vehicle passes by was about 0.03 nT. The peak of the target signal was about 30 times the background field.

Figure 12:
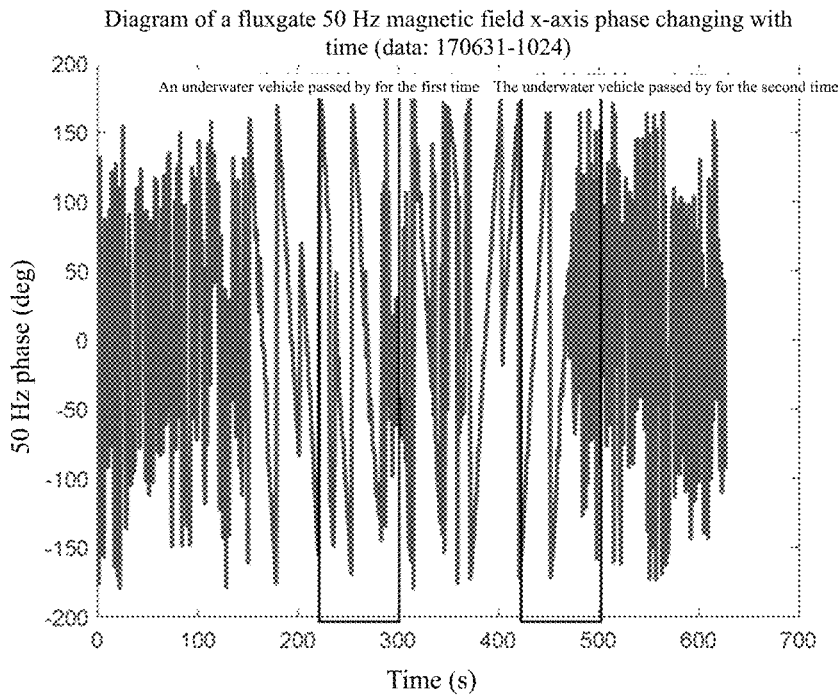
FIG. 12 is a diagram of a fluxgate 50 Hz magnetic field x-axis phase changing with time according to an embodiment of the present invention.

Fourier decomposition was performed on the original signal to extract a 50 Hz phase spectrum. Fourier decomposition was further performed on the 50 Hz signal to extract a 50 Hz phase spectrum. As shown in FIG. 12, it can be seen that when the target passed by, the phase spectrum became dense, then became sparse, and then became dense.

Figure 13:
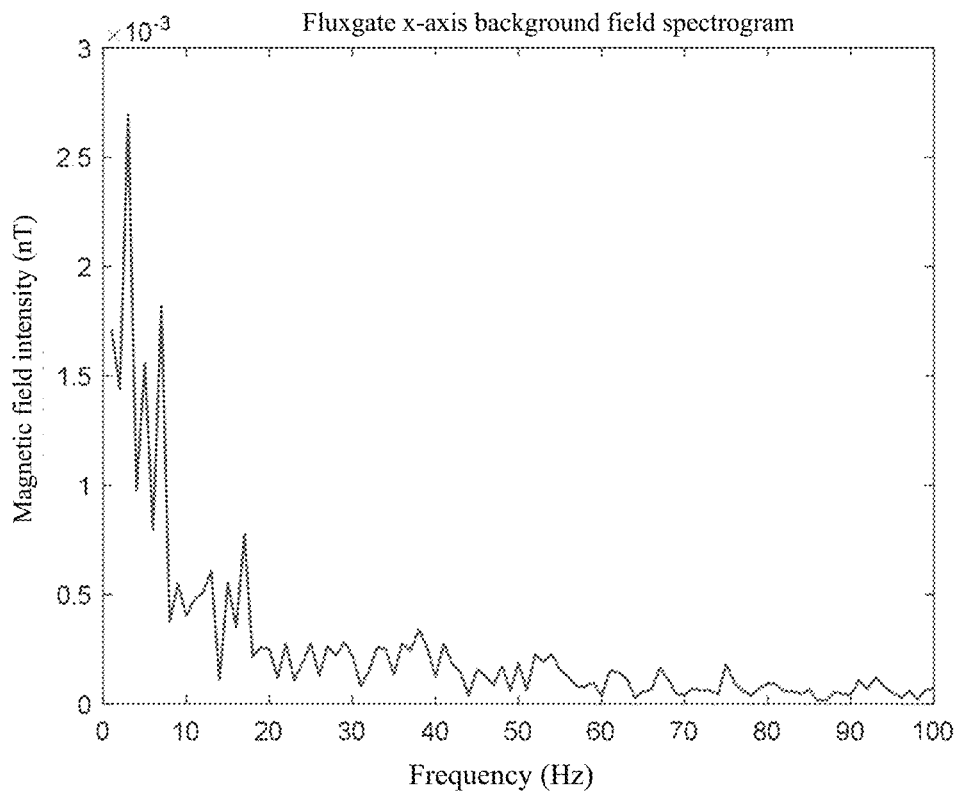
FIG. 13 is a spectrogram of a fluxgate x-axis background field according to an embodiment of the present invention.
Figure 14:
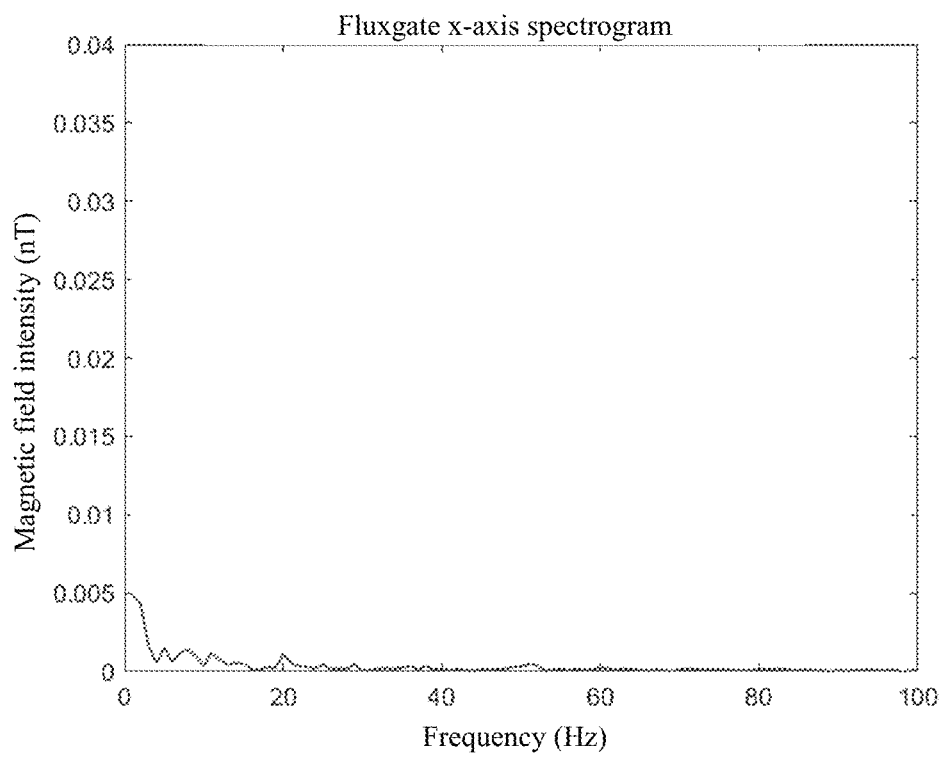
FIG. 14 is a schematic diagram of a change in a frequency component when an x-axis component target begins to approach a fluxgate according to an embodiment of the present invention.
Figure 15:
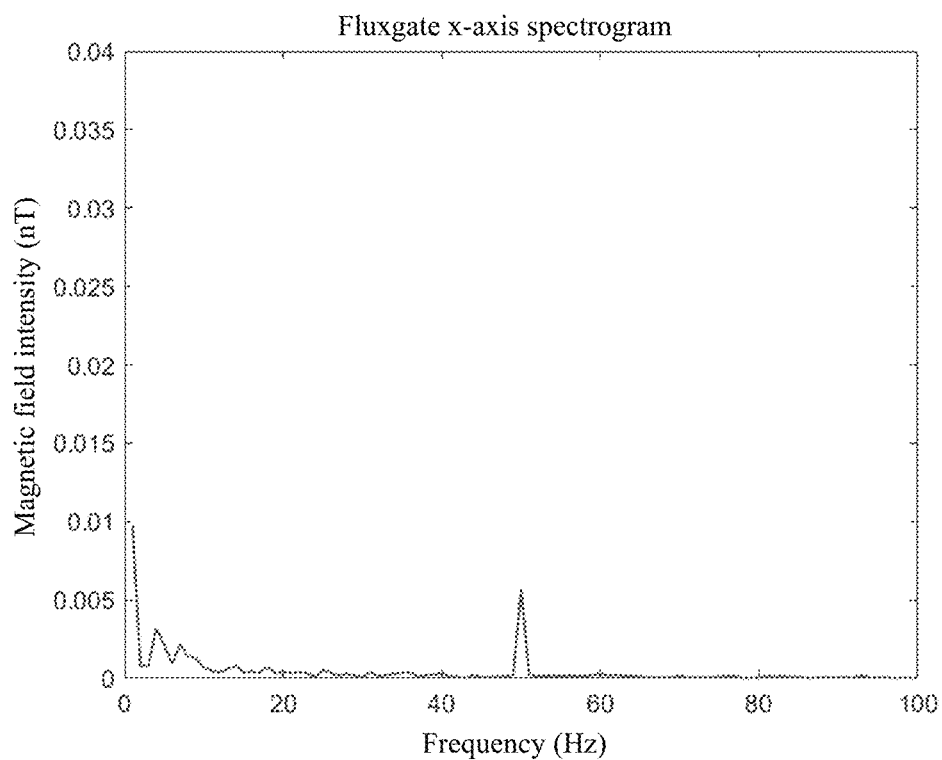
FIG. 15 is a schematic diagram of a change in a frequency component when an x-axis component target approaches a fluxgate according to an embodiment of the present invention.
Figure 16:
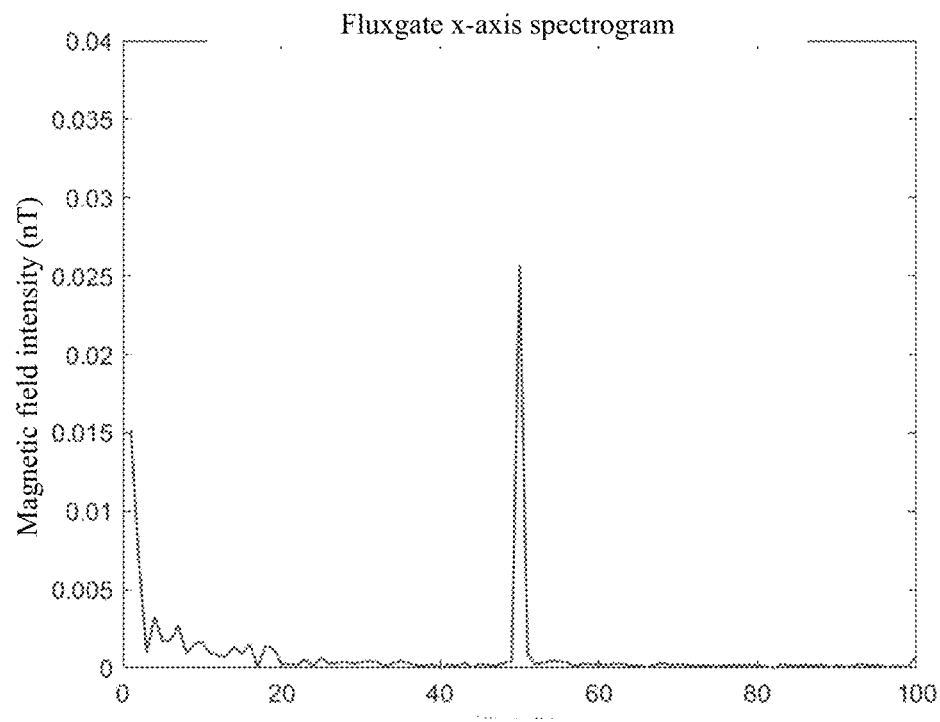
FIG. 16 is a schematic diagram of a change in a frequency component when a front end of an x-axis component target passes a fluxgate according to an embodiment of the present invention.
Figure 17:
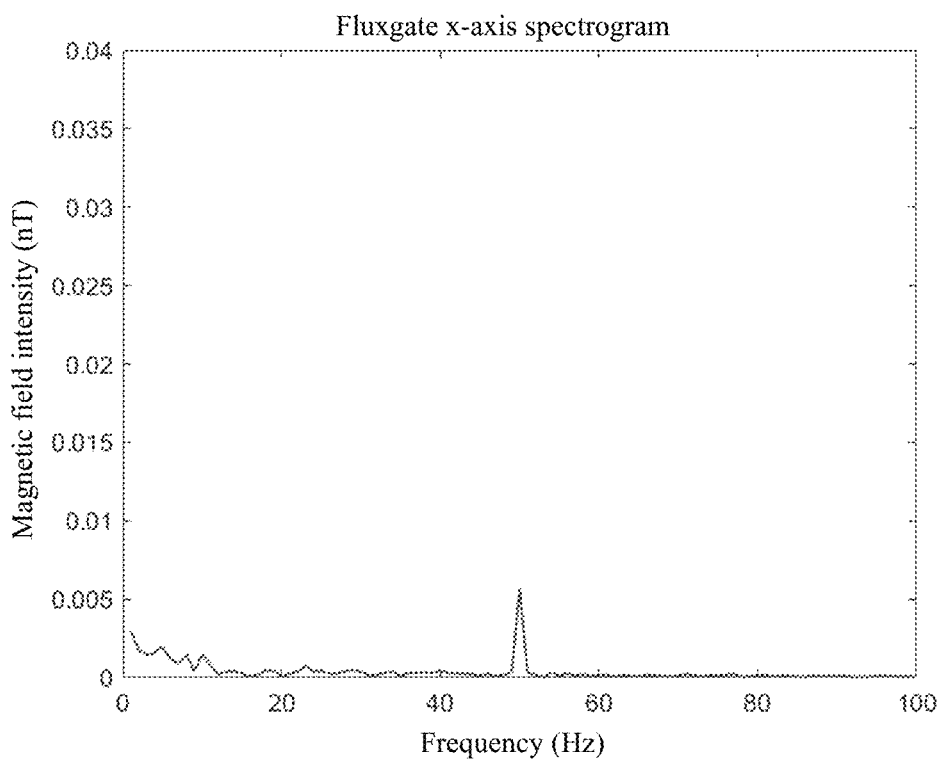
FIG. 17 is a schematic diagram of a change in a frequency component when an x-axis component target begins to move away from a fluxgate according to an embodiment of the present invention.
Figure 18:
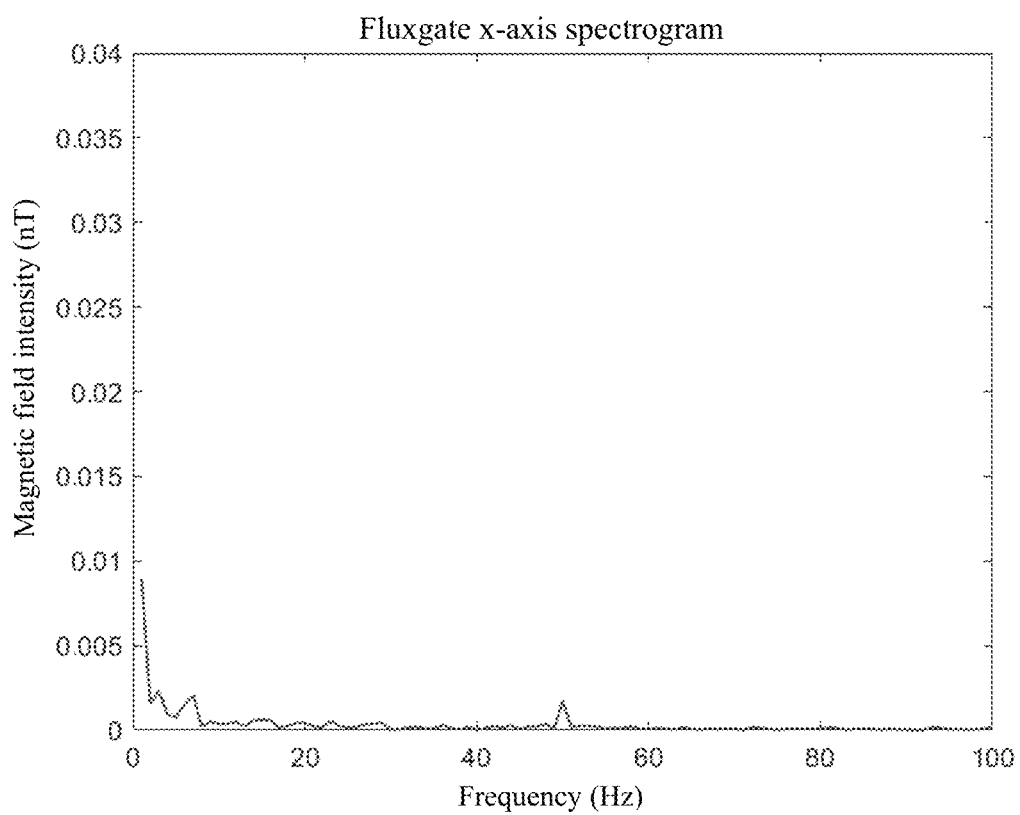
FIG. 18 is a schematic diagram of a change in a frequency component when an x-axis component target moves away from a fluxgate according to an embodiment of the present invention.

Spectral analysis was performed according to a change in the frequency component when the underwater target moves. When the underwater vehicle passed the sensor, the magnetic field intensity of the 50 Hz signal component thereof changed in an overall pattern of increase, decrease, increase, and decrease. When the underwater vehicle approached the sensor, the 50 Hz magnetic field intensity increased gradually. When a front end of the underwater vehicle reached the sensor, the magnetic field intensity reached a peak, and then decreases gradually. When the middle of the underwater vehicle reached the sensor, the magnetic field intensity decreased to a lowest point, and then increased gradually. When a rear end of the underwater vehicle reached the sensor, the magnetic field intensity reached a peak again, and then decreased gradually to the background field intensity. A measured fluxgate x-axis background field intensity spectrogram is shown in FIG. 13. Details of the change are shown in FIG. 14 to FIG. 18. The spectrograms of different time points when the underwater vehicle passed the sensor were selected for observation of change in the magnetic field intensity when the underwater vehicle passed by. It can be seen that when the underwater vehicle was furthest from the sensor, the magnetic field intensity of the 50 Hz frequency component of the background field was about 0.3 pT. When the front end of the underwater vehicle passed the sensor, the frequency component of the 50 Hz signal reached a peak of about 25 pT that was 83 times that of the background field.

The following conclusion can be reached: when an underwater vehicle passes a sensor, magnetic field intensity of a 50 Hz signal component thereof increases significantly, and the peak is 83 times background field intensity. An obvious disturbance can be observed, and the disturbance lasts over a plurality of time windows. When the underwater vehicle moves away gradually, the magnetic field intensity decreases gradually to the background field intensity. Therefore, it is believed that a disturbance signal generated when an underwater vehicle passes a sensor can be effectively detected.

It can be easily understood by those skilled in the art that the foregoing description is only preferred embodiments of the present invention and is not intended to limit the present invention. All the modifications, identical replacements and improvements within the spirit and principle of the present invention should be in the scope of protection of the present invention.

The invention claimed is:

1. A sequence time window amplitude-phase-frequency characteristics analysis method for underwater vehicle power frequency electromagnetic field disturbance, comprising:

determining background field data, the background field data referring to power frequency electromagnetic data obtained when no ferromagnetic target object is present in a predetermined region, if power frequency electromagnetic measurement can be directly performed in the predetermined region, acquiring the background field data by means of actual measurement, otherwise, acquiring the background field data by constructing a power grid dipole group model for the predetermined region to perform emulation;

determining measured data obtained when a target object passes through the predetermined region, the target object being an underwater vehicle;

respectively performing a short-time Fourier transform on the background field data and the measured data, extracting a 50 Hz electromagnetic signal corresponding to each piece of the above data, and performing Fourier sliding window decomposition on each 50 Hz electromagnetic signal to acquire a corresponding sliding sequence time window signal;

when a disturbance signal is present in a certain time window sequence in the sliding sequence time window signal of the measured data, cut the disturbance signal continues over a plurality of time windows, considering that an underwater vehicle is passing through the predetermined region;

comparing amplitude intensities of the sliding sequence time window signal of the background field data and the sliding sequence time window signal of the measured data, and determining, according to a comparison change in the amplitude intensity, a location in the predetermined region through which the underwater vehicle is passing; and analyzing a phase spectrum of the 50 Hz electromagnetic signal of the measured data to determine a pattern of change of the phase spectrum when the underwater vehicle passes through the predetermined region.

2. The sequence time window amplitude-phase-frequency characteristics analysis method according to claim 1, wherein the acquiring the background field data by constructing a power grid dipole group model for the predetermined region to perform emulation specifically comprises:

constructing a power grid dipole group model comprising an air layer, a sea layer, a land layer, a seabed layer and an ionized layer, and a relative magnetic permeability and a relative electrical conductivity corresponding to each layer;

emulating, on the basis of the power grid dipole group model, a power frequency magnetic field intensity of a background field that can be actually measured, and acquiring emulated background field data;

actually performing power frequency electromagnetic field measurement on the background field to acquire measured background field data;

comparing the emulated background field data and the measured background field data, determining a relative error, and adjusting the power grid dipole group model on the basis of the relative error, such that a relative error of background field data emulated by the power grid dipole group model relative to the measured background field data is less than a preset error value; and using the adjusted power grid dipole group model to emulate a background field that cannot be actually measured so as to acquire corresponding background field data thereof.

3. The sequence time window amplitude-phase-frequency characteristics analysis method according to claim 1, wherein the power frequency electromagnetic data of the predetermined region is measured by means of a sensor;

a plurality of such sensors are provided to acquire electromagnetic signals in specified locations, and when a ferromagnetic target object passes through the specified locations where the sensors are located, the electromagnetic signals in the locations change; and the sensors are placed in the predetermined region.

4. The sequence time window amplitude-phase-frequency characteristics analysis method according to claim 1, wherein the determining, according to a comparison change in the amplitude intensity, a location in the predetermined region through which the underwater vehicle is passing specifically comprises:

when the underwater vehicle passes through the predetermined region, a magnetic field intensity of a 50 Hz electromagnetic signal component corresponding to the measured data changes in an overall pattern of increase, decrease, increase, and decrease.

5. The sequence time window amplitude-phase-frequency characteristics analysis method according to claim 3, wherein the determining, according to a comparison change in the amplitude intensity, a location in the predetermined region through which the underwater vehicle is passing specifically comprises:

when the underwater vehicle approaches the sensor, a magnetic field intensity of a 50 Hz electromagnetic signal component corresponding to the measured data increases gradually; and when a front end of the underwater vehicle reaches the sensor, the magnetic field intensity reaches a peak, and then decreases gradually.

6. The sequence time window amplitude-phase-frequency characteristics analysis method according to claim 3, wherein the determining, according to a comparison change in the amplitude intensity, a location in the predetermined region through which the underwater vehicle is passing specifically comprises:

when the middle of the underwater vehicle reaches the sensor, the magnetic field intensity decreases to a lowest point, and then increases gradually; and when a rear end of the underwater vehicle reaches the sensor, the magnetic field intensity reaches a peak again, and then decreases gradually to a magnetic field intensity of a background field, the value of the magnetic field intensity of the background field being determined according to a 50 Hz electromagnetic signal component corresponding to background field data.

7. The sequence time window amplitude-phase-frequency characteristics analysis method according to claim 3, wherein the analyzing a phase spectrum of the 50 Hz electromagnetic signal of the measured data to determine a pattern of change of the phase spectrum when the underwater vehicle passes through the predetermined region specifically comprises:

performing Fourier decomposition on the measured data to extract the 50 Hz electromagnetic signal, and further performing Fourier decomposition on the 50 Hz electromagnetic signal to extract a 50 Hz phase spectrum, wherein when the underwater vehicle passes the sensor, the phase spectrum changes in a dense-sparse-dense pattern.

* * * * *